United States Patent
Hasui

(10) Patent No.: US 9,625,975 B2
(45) Date of Patent: Apr. 18, 2017

(54) INFORMATION PROCESSING APPARATUS CAPABLE OF CONNECTING TO NETWORK IN POWER SAVING STATE, METHOD OF CONTROLLING THE SAME, AND STORAGE MEDIUM

(71) Applicant: CANON KABUSHIKI KAISHA, Tokyo (JP)

(72) Inventor: Shigeki Hasui, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 297 days.

(21) Appl. No.: 14/225,685

(22) Filed: Mar. 26, 2014

(65) Prior Publication Data

US 2014/0298054 A1   Oct. 2, 2014

(30) Foreign Application Priority Data

Mar. 29, 2013 (JP) ................................ 2013-073048

(51) Int. Cl.
| | |
|---|---|
| *G06F 1/32* | (2006.01) |
| *H04N 1/00* | (2006.01) |
| *H04N 1/333* | (2006.01) |

(52) U.S. Cl.
CPC .......... *G06F 1/3243* (2013.01); *G06F 1/3209* (2013.01); *G06F 1/3284* (2013.01); *H04N 1/00217* (2013.01); *H04N 1/00891* (2013.01); *H04N 1/00896* (2013.01); *H04N 1/33384* (2013.01); *H04N 2201/0055* (2013.01); *Y02B 60/1239* (2013.01); *Y02B 60/1267* (2013.01); *Y02B 60/41* (2013.01); *Y02B 60/50* (2013.01)

(58) Field of Classification Search
CPC ........ G06F 1/32; G06F 1/3243; G06F 1/3209; Y02B 60/34; Y02B 60/35; Y02B 60/41
See application file for complete search history.

(56) References Cited

U.S. PATENT DOCUMENTS

| | | | | |
|---|---|---|---|---|
| 7,916,687 B2* | 3/2011 | Deshpande | ............. | H04L 12/12 370/328 |
| 8,732,497 B2* | 5/2014 | Yokokura | ............. | G06F 1/3209 713/320 |

(Continued)

FOREIGN PATENT DOCUMENTS

JP   2010-288225 A   12/2010

*Primary Examiner* — Zahid Choudhury
(74) *Attorney, Agent, or Firm* — Rossi, Kimms & McDowell LLP

(57) ABSTRACT

An information processing apparatus capable of changing packet patterns for determining, based on a condition of proxy ARP compatibility of a connected wireless LAN access point, communication requests to which the apparatus can respond in a power saving state, and thereby maintaining the power saving state for a longer time period. A RAM of an MFP operable in the normal state and the power saving state stores packet patterns which enable the MFP to respond to packets received in the power saving state while maintaining the power saving state. The MFP acquires proxy ARP support information from a wireless LAN access point that relays communication between the MFP and an external apparatus. The MFP determines whether or not the AP can respond to a received communication request on its behalf, and changes the packet patterns based on the determination result.

14 Claims, 11 Drawing Sheets

(56) References Cited

U.S. PATENT DOCUMENTS

2012/0303988 A1* 11/2012 Yasuda .................. H04L 12/10
   713/320
2012/0311692 A1* 12/2012 Ebina .................. H04L 12/6418
   726/13

* cited by examiner

FIG.8A

| ID | REQUEST TYPE | OPERATION UPON RECEIPT | ENABLED/ DISABLED |
|---|---|---|---|
| 1 | ARP | RESPOND IN POWER SAVING STATE | ENABLED |
| 2 | SNMP | RESPOND IN POWER SAVING STATE | ENABLED |
| 3 | TO SELF-APPARATUS | RESPOND IN NORMAL STATE | ENABLED |

FIG.8B

| ITEM | PATTERN STRING | BYTE LENGTH |
|---|---|---|
| DESTINATION ETHER ADDRESS | ff:ff:ff:ff:ff:ff | 6 |
| FRAME TYPE | 0806 | 2 |
| PROTOCOL TYPE | 0800 | 2 |
| OPERATION | 1 | 2 |

FIG.8C

| ID | REQUEST TYPE | OPERATION UPON RECEIPT | ENABLED/ DISABLED |
|---|---|---|---|
| 1 | SNMP | RESPOND IN POWER SAVING STATE | ENABLED |
| 2 | TO SELF-APPARATUS | RESPOND IN NORMAL STATE | ENABLED |

FIG.8D

| ID | REQUEST TYPE | OPERATION UPON RECEIPT | ENABLED/ DISABLED |
|---|---|---|---|
| 1 | SNMP | RESPOND IN POWER SAVING STATE | ENABLED |
| 2 | SNMP(UNIQUE MIB) | RESPOND IN POWER SAVING STATE | ENABLED |
| 3 | TO SELF-APPARATUS | RESPOND IN NORMAL STATE | ENABLED |

FIG.8E

| REQUEST TYPE | NUMBER OF TIMES OF RECEPTION |
|---|---|
| SNMP | 100 |
| SNMP (UNIQUE MIB2) | 50 |
| SNMP (UNIQUE MIB3) | 20 |
| SNMP (UNIQUE MIB4) | 20 |

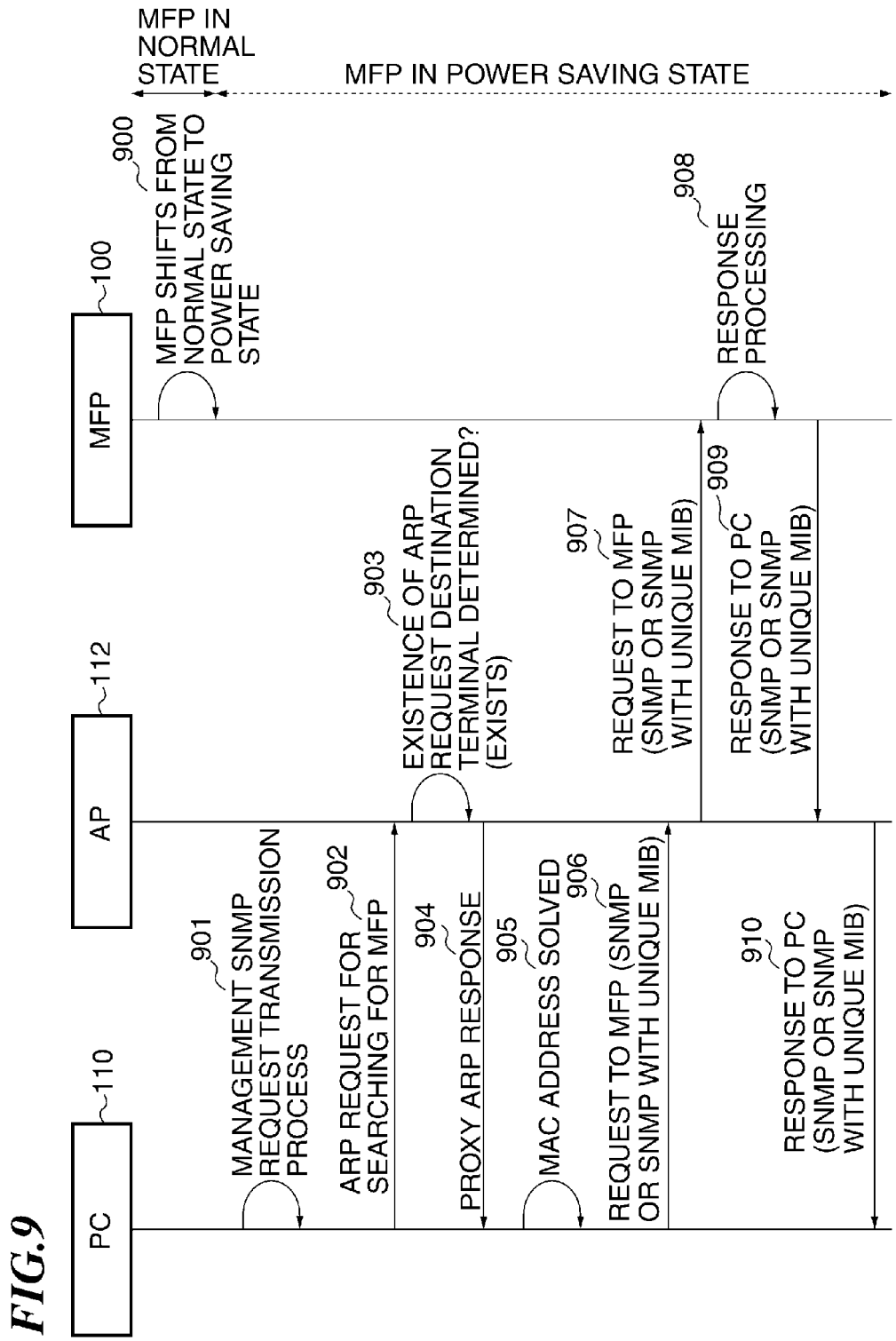

INFORMATION PROCESSING APPARATUS CAPABLE OF CONNECTING TO NETWORK IN POWER SAVING STATE, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium, and more particularly to a technique for controlling a response of an information processing apparatus capable of connecting to a network in a power saving state, to a communication request.

Description of the Related Art

In recent years, along with spreading of network environments, such as wireless LANs (local area networks), devices have become popular which are equipped with a wireless LAN function enabling wireless connection to a network via a wireless LAN access point provided on the network. For example, in an office in which a wireless LAN is constructed, data is exchanged by wireless communication between a multifunction peripheral (multifunction printer) equipped with the wireless LAN function and a plurality of PCs (personal computers).

Further, with increasing awareness of environmental problems, there is a strong demand for introducing a power saving technique for reducing power consumed by every electrical equipment used e.g. in an office. As the power saving technique for wireless LAN-equipped devices, IEEE 802.11v is standardized by IEEE (Institute of Electrical and Electronic Engineers). Functions constituting the IEEE 802.11v standard include proxy ARP (address resolution protocol). In proxy ARP, a wireless LAN access point responds to an ARP request on behalf of a wireless LAN client device thereunder. This makes it possible to prevent the wireless LAN client device from operating only for responding to broadcast ARP requests frequently received via the network, whereby the wireless LAN client device can continue the power saving state.

On the other hand, as a power saving technique for a multifunction peripheral, a technique is known which reduces standby power consumption by automatically shifting the multifunction peripheral to the power saving state in a case where the apparatus in a normal state is not operated for a predetermined time period.

Further, there has been proposed a technique in which a sub control unit smaller in size than a main control unit is provided for operation by minimum power supply in the power saving state, and network processing to be performed by the main control unit when in the normal state is caused to be performed by the sub control unit on behalf of the main control unit when in the power saving state, to thereby realize both of network connectivity and power saving.

The network processing performed by the sub control unit when in the power saving state is smaller in scale than the network processing performed by the main control unit, and it is difficult for the sub control unit to respond to all communication requests from PCs to the multifunction peripheral. The sub control unit determines whether or not it is possible to process a received communication request, and if it is impossible to process the request, the multifunction peripheral needs to be quickly shifted from the power saving state to the normal state, to cause the main control unit to respond to the communication request via the network. To realize this, there has been disclosed a technique for determining whether an information processing apparatus in the power saving state can respond to a communication request received in the power saving state, or the information processing apparatus is required to shift to the normal state to respond to the communication request. For example, in Japanese Patent Laid-Open Publication No. 2010-288225, there has been proposed a technique for performing pattern-based discrimination between communication requests received by an information processing apparatus in the power saving state.

In the technique disclosed in Japanese Patent Laid-Open Publication No. 2010-288225, the information processing apparatus is equipped with a function for determining whether the packet pattern of a received communication request is a proxy response pattern for executing proxy response in the power saving state or a proxy response candidate pattern different from the proxy response pattern, and if the pattern of the communication request is not a proxy response pattern, the information processing apparatus shifts from the power saving state to the normal state. Further, information for the above-described determination is updated according to a condition of reception of the communication request. As a consequence, the information processing apparatus realizes switching between the response processing in the normal state and that in the power saving state. Further, by setting patterns of communication requests frequently received as proxy response patterns, the frequency of occasions of response in the power saving state is increased whereby it is possible to maintain the power saving state for a longer time period.

Here, suppose that an information processing apparatus equipped with the wireless LAN function performs wireless connection to a network via a wireless LAN access point supporting proxy ARP defined by the IEEE 802.11v standard. Under such a network environment, the wireless LAN access point can respond to an ARP request addressed to the information processing apparatus on its behalf. The information processing apparatus does not receive the ARP request, and hence it is not necessary to provide a pattern setting for responding to the ARP request in the power saving state.

However, if the technique disclosed in Japanese Patent Laid-Open Publication No. 2010-288225 is applied to the information processing apparatus under the above-mentioned network environment, the following problem arises: The information processing apparatus does not receive the ARP request since it is connected to the network via the wireless LAN access point supporting proxy ARP defined by the IEEE 802.11v standard, and for example, a packet pattern associated with an ARP request, which has been initially set as a proxy response pattern, becomes useless due to zero frequency of usage. Further, this prevents other patterns of packets which are frequently received from being set as proxy response patterns, which makes it impossible to keep the power saving state longer than otherwise. Furthermore, load of processing for transfer of packet patterns and a memory capacity required for holding the packet patterns are wastefully increased by the useless pattern. In short, the information processing apparatus connected to the wireless LAN access point is required to set proper packet patterns which are not useless, according to a result of determination of whether or not the access point performs proxy ARP.

SUMMARY OF THE INVENTION

The present invention provides an information processing apparatus that is capable of changing, based on a condition of proxy ARP compatibility of a connected wireless LAN access point, packet patterns for determining communication requests to which the apparatus can respond in a power saving state, and thereby maintaining the power saving state for a longer time period.

In a first aspect of the present invention, there is provided an information processing apparatus that is capable of operating in a first power mode and a second power mode which is smaller in power consumption than the first power mode, comprising a storage unit configured to store packet patterns which enable the information processing apparatus to respond to packets received when the information processing apparatus operates in the second power mode, while maintaining the second power mode, an acquisition unit configured to acquire capability information of a relay apparatus that relays communication between the information processing apparatus and an external apparatus, a determination unit configured to determine whether or not the packet patterns stored in the storage unit are to be changed, based on the capability information acquired by the acquisition unit, and a changing unit configured to change the packet patterns stored in the storage unit when the determination unit determines that the packet patterns stored in the storage unit are to be changed.

In a second aspect of the present invention, there is provided a method of controlling an information processing apparatus that is capable of operating in a first power mode and a second power mode which is smaller in power consumption than the first power mode, comprising storing packet patterns which enable the information processing apparatus to respond to packets received when the information processing apparatus operates in the second power mode, while maintaining the second power mode, acquiring capability information of a relay apparatus that relays communication between the information processing apparatus and an external apparatus, determining whether or not the packet patterns stored by said storing are to be changed, based on the capability information acquired by said acquiring, and changing the packet patterns stored by said storing when said determining determines that the packet patterns stored by said storing are to be changed.

In a third aspect of the present invention, there is provided a non-transitory computer-readable storage medium storing a computer-executable program for causing a computer to execute a method of controlling an information processing apparatus that is capable of operating in a first power mode and a second power mode which is smaller in power consumption than the first power mode, wherein the method comprises storing packet patterns which enable the information processing apparatus to respond to packets received when the information processing apparatus operates in the second power mode, while maintaining the second power mode, acquiring capability information of a relay apparatus that relays communication between the information processing apparatus and an external apparatus, determining whether or not the packet patterns stored by said storing are to be changed, based on the capability information acquired by said acquiring, and changing the packet patterns stored by said storing when said determining determines that the packet patterns stored by said storing are to be changed.

According to the present invention, the information processing apparatus stores packet patterns which enable the information processing apparatus to respond to received packets while maintaining the second power mode smaller in power consumption, acquires capability information of a relay apparatus that relays communication between the information processing apparatus and an external apparatus, determines whether or not the stored packet patterns are to be changed, based on the capability information, and changes the stored packet pattern according to the determination. Therefore, by using the changed packet patterns in the second power mode smaller in power consumption, it is possible to perform response processing on a larger number of communication requests by a change of the packet patterns. As a result, it is possible to maintain the power saving state for a longer time period, and thereby realize further power saving of the information processing apparatus.

Further features of the present invention will become apparent from the following description of exemplary embodiments (with reference to the attached drawings).

BRIEF DESCRIPTION OF THE DRAWINGS

FIG. 8A is a diagram showing an example of packet patterns stored in the MFP in their initial state.

FIG. 8B is a diagram showing details of an ARP request pattern appearing in FIG. 8A.

FIG. 8C is a diagram showing an example of packet patterns obtained by the proxy ARP pattern deletion process.

FIG. 8D is a diagram showing an example of the packet patterns after adding/changing a pattern in a step in FIG. 7.

FIG. 8E is a diagram showing an example of a count table used when adding/changing a pattern.

FIG. 9 is a sequence diagram of a flow of a data communication process executed between a PC, the MFP, and the AP.

DESCRIPTION OF THE EMBODIMENTS

The present invention will now be described in detail below with reference to the accompanying drawings showing embodiments thereof.

Figure 1:
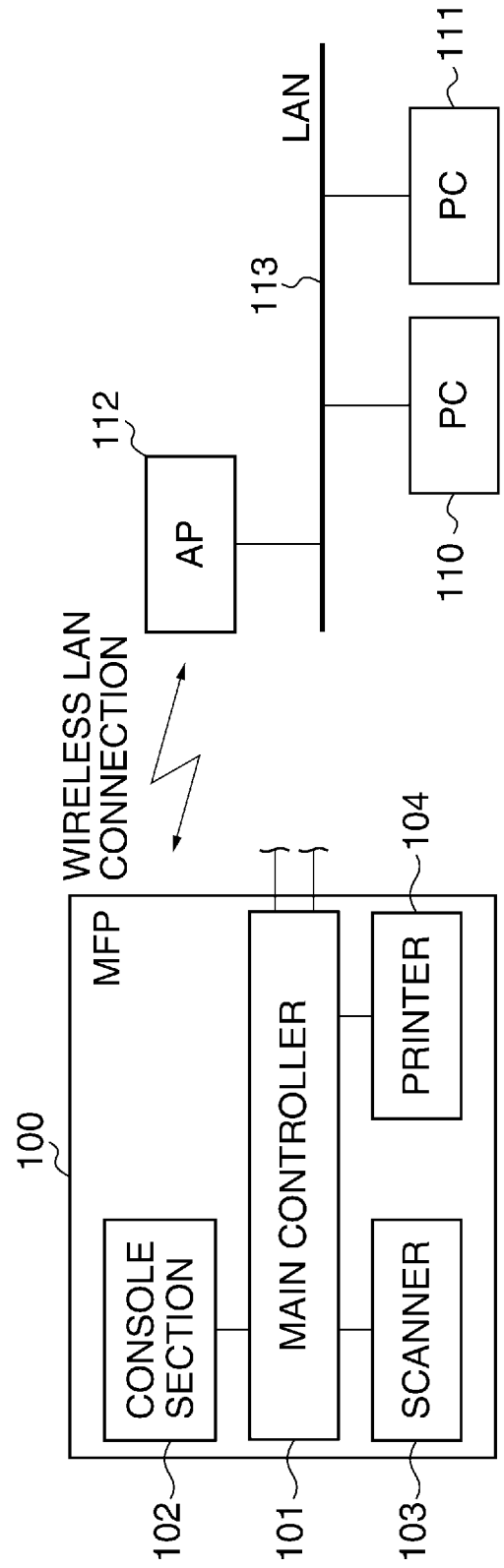
FIG. 1 is a diagram showing an example of a network environment including an MFP as an information processing apparatus according to an embodiment of the present invention.

FIG. 1 is a diagram showing an example of a network environment including an MFP as an information processing apparatus according to an embodiment of the present invention.

The MFP (multifunction peripheral) denoted by reference numeral 100 is an information processing apparatus that performs input and output of image data, transmission and reception of the same, and various kinds of image processing associated with the image data.

The MFP 100 includes a main controller 101 that controls the overall operation of the MFP 100, a console section 102 as a user interface, a scanner section 103 as an image input device, and a printer section 104 as an image output device.

The main controller 101 is connected to the console section 102, the scanner section 103, and the printer section 104, and controls the operations of these respective sections.

The MFP 100 is equipped with a communication function for connecting to a wireless LAN access point (AP) 112 (relay apparatus) in a LAN (local area network) 113 by wireless LAN connection.

The access point 112 is connected to PCs 110 and 111, which are personal computers, via the LAN 113.

Next, the main controller 101 appearing in FIG. 1 will be described with reference to FIG. 2.

Figure 2:
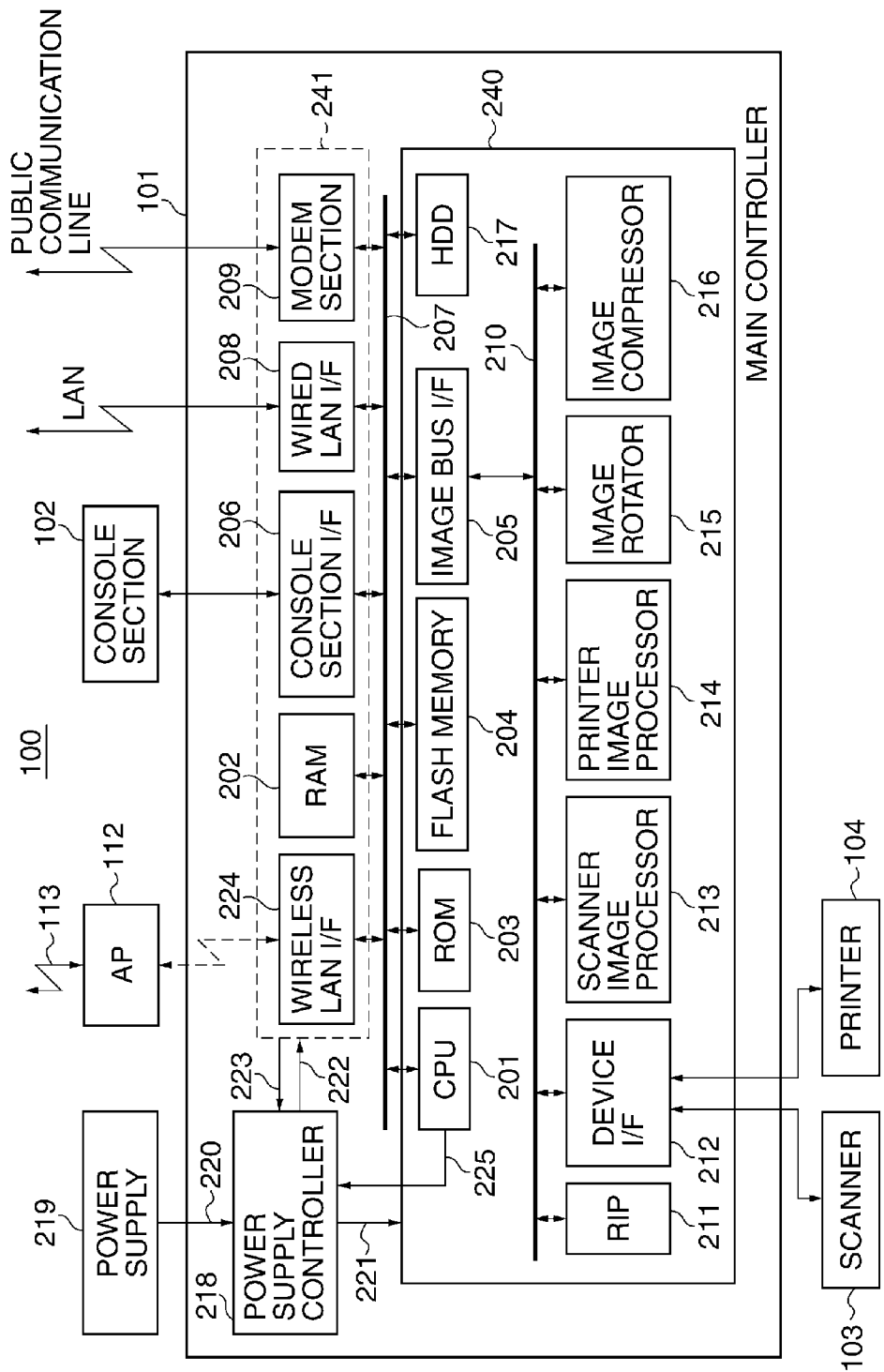
FIG. 2 is a schematic block diagram of a main controller appearing in FIG. 1.

FIG. 2 is a schematic block diagram of the main controller 101 appearing in FIG. 1.

The main controller 101 includes components described as follows.

A CPU (central processing unit) 201 is connected to a RAM (random access memory) 202 and a ROM (read only memory) 203 via a system bus 207. Further, the CPU 201 is connected to a flash memory 204, an image bus interface 205, a console section interface 206, a wired LAN interface 208, a modem section 209, and a wireless LAN interface 224 via the system bus 207.

The RAM 202 is a readable/writable memory which provides a work area for the CPU 201. The RAM 202 is also used as an image memory for temporarily storing image data. The ROM 203 is a boot ROM that stores a boot program for the system. The flash memory 204 is a nonvolatile memory that stores system software, setting data, etc. required to be held even after the power of the image processing apparatus 100 is turned off.

The console section interface 206 provides interface for inputting and outputting data to and from the console section 102 including a liquid crystal touch panel, etc. The console section interface 206 is used to output image data to be displayed to the console section 102, and transfer information input by a user via the console section 102 to the CPU 201.

The wired LAN interface 208 provides interface for connection to the LAN, and is used to input and output information to and from the LAN. Note that this LAN is a different one from the LAN 113. The modem section 209 provides interface for connection to the public communication line, and is used to send and receive information via the public communication line.

The image bus interface 205 provides interface for connection between the system bus 207 and an image bus 210, and functions as a bus bridge for converting the data structure.

Connected to the image bus 210 are a RIP (raster image processor) 211, a device interface 212, a scanner image processor 213, a printer image processor 214, an image rotator 215, and an image compressor 216.

The RIP 211 rasterizes PDL (page description language) data received from the outside e.g. via the LAN into a bitmap image. The device interface 212 provides interface for connection between the scanner section 103 and the printer section 104, and the main controller 101, and performs synchronous-to-asynchronous or asynchronous-to-synchronous conversion of image data.

The scanner image processor 213 corrects, processes, edits, or other processing on input image data read by the scanner section 103. The printer image processor 214 performs color conversion, filtering, resolution conversion, or other processing on image data to be output to the printer section 104. The image rotator 215 rotates image data. The image compressor 216 performs JPEG compression/decompression on multi-valued image data, and JBIG, MMR, or MH compression/decompression on binary image data.

A HDD (hard disk drive) 217 is a nonvolatile storage device that stores various kinds of data, such as image data, system data, and user-specific data, and operation programs executed by the CPU 201. Note that when the main controller 101 does not include the HDD 217, the above-mentioned various kinds of data are stored in the flash memory 204.

A power supply controller 218 supplies DC power received from a power supply 219 as a power supply unit via a power supply line 220, to a main control unit 240 and a sub control unit 241 included in the main controller 101 via power supply lines 221 and 222.

The main control unit 240 includes the CPU 201, the ROM 203, the flash memory 204, the image bus interface 205, the RIP 211, the device interface 212, the scanner image processor 213, and the printer image processor 214. Further, the main control unit 240 includes the image rotator 215, and the image compressor 216, and the HDD 217.

On the other hand, the sub control unit 241 includes the wireless LAN interface 224, the RAM 202, the console section interface 206, the wired LAN interface 208, and the modem section 209.

The power supply line 221 is connected to the components of the main control unit 240. The power supply line 222 is connected to the components of the sub control unit 241.

The power supply 219 is provided with two systems of power circuits, i.e. a large power circuit for large power supply, not shown, and a small power circuit for small power supply, not shown.

The power supply controller 218 receives a control signal from the sub control unit 241 via a control signal line 223 and a control signal from the CPU 201 via a control signal line 225. Then, the power supply controller 218 controls power to be supplied via the power supply lines 221 and 222 based on the received control signals. Further, the power supply controller 218 performs power supply control by switching the power circuit according to a power state of the MFP 100, described hereinafter.

The wireless LAN interface 224 provides interface for connection to the access point 112 connected to the LAN 113, as a communication control unit. The wireless LAN interface 224 performs wireless communication based on the connection method and communication speed defined by a standard, such as IEEE 802.11b/a/g/n, standardized by IEEE (Institute of Electrical and Electronic Engineers). The main controller 101 can be connected to the LAN 113 by wirelessly connecting to the access point 112 via the wireless LAN interface 224.

As described above, the main controller 101 is connected to the LAN and a public communication line to send and receive image information, device information, and other various information, to and from external devices, via the wired LAN interface 208, the modem section 209, and the wireless LAN interface 224.

The MFP 100 is provided with two operation modes, i.e. a normal power mode and a power-saving mode, in one of which the MFP 100 operates depending on a power state thereof.

In the normal power mode, the CPU 201 controls the power supply controller 218 such that supply of power to the power supply line 221 and the power supply line 222 is enabled. As a consequence, power is supplied to both of the main control unit 240 and the sub control unit 241, whereby the MFP 100 operates in the normal power state (first power mode).

In the power-saving mode, the CPU 201 controls the power supply controller 218 such that supply of power to the power supply line 222 is enabled and supply of power to the power supply line 221 is disabled. As a consequence, power supply to the main control unit 240 is cut off, whereby the MFP 100 operates in the power saving state (second power mode). In the power saving state, it is possible to considerably reduce power consumption of the MFP 100 than in the normal power state.

In the MFP 100 in the power saving state, for example, when a print job is received via the access point 112, the wireless LAN interface 224 controls the power supply controller 218 to thereby cause the MFP 100 to return from the power saving state to the normal state. Note that the MFP 100 can return from the power saving state to the normal state not only when data is received by the wireless LAN interface 224, but also when data is received by the wired LAN interface 208, when a facsimile is received by the modem section 209, or when a button, not shown, provided on the console section 102 is pressed.

In the power-saving mode, power is also supplied to the RAM 202, and accordingly the RAM 202 backs up a system program loaded therein by self-refresh operation. As a consequence, when the MFP returns from the power saving state to the normal state, the system program loaded in the RAM 202 immediately operates, which makes it possible to quickly perform state restoration.

Although in the above description, power supply to the main control unit 240 including the CPU 201 is cut off in the power-saving mode, this is not limitative. For example, another form of the power-saving mode may be defined by a power state in which power is lower than in the normal power mode without cutting off power supply to the main control unit 240. In this case, in the power-saving mode, it is necessary to lower the operating frequency of the CPU 201 than in the normal power mode, whereby processing performance of the CPU 201 per unit time is lowered. Therefore, even when power supply is reduced in the power-saving mode, similarly to the case of power supply being cut off, for example, a situation occurs in which due to reception of a large number of packets, they cannot be processed in the power-saving mode, and it is required to return the MFP 100 to the normal state to execute response processing on the received packets.

Next, the wireless LAN interface 224 appearing in FIG. 2 will be described in detail with reference to FIG. 3.

Figure 3:
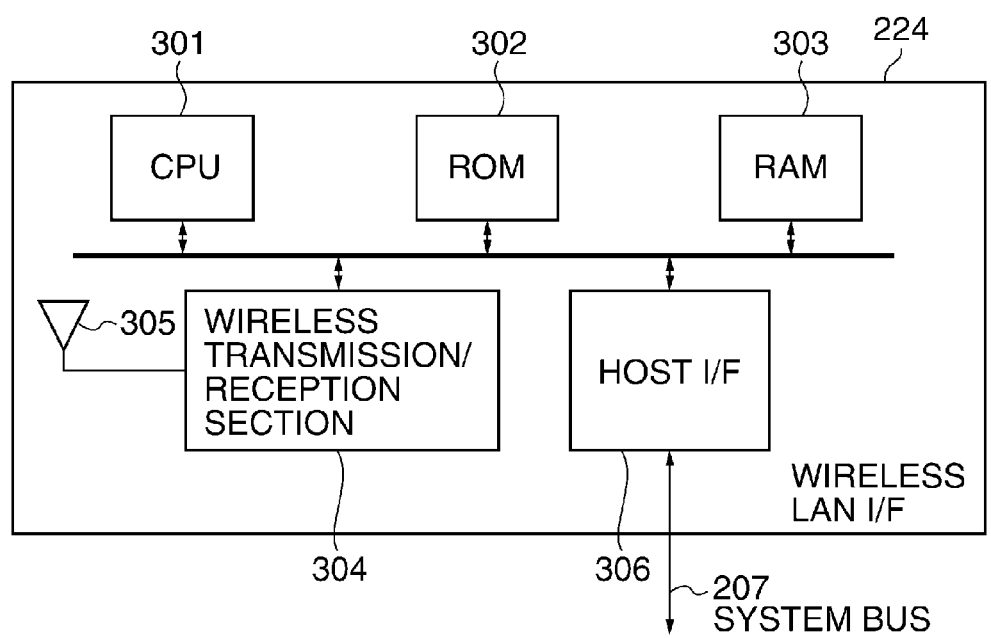
FIG. 3 is a detailed block diagram of a wireless LAN interface appearing in FIG. 2.

FIG. 3 is a detailed block diagram of the wireless LAN interface 224 appearing in FIG. 2.

The wireless LAN interface 224 is formed by a sub system comprising a CPU 301, a ROM 302, a RAM 303, a wireless transmission/reception section 304, an antenna 305, and a host interface 306.

The CPU 301 functions as a main controller of the wireless LAN interface 224. The ROM 302 stores a boot program executed according to a starting sequence of the main controller 101 when the wireless LAN interface 224 is started up, and an operation program executed by the CPU 301.

The CPU 301 controls the wireless LAN interface 224 based on the operation program stored in the ROM 302.

The RAM 303 is used as a work memory for the CPU 301. Further, the RAM 303 stores information on a communication method, an authentication method, a MAC (media access control) address, an IP (internet protocol) address, etc., as various management information used for wirelessly connecting to the access point 112. The RAM 303 further stores packet patterns for determining a communication request to which the MFP 100 can respond during the power saving state. Note that in the present embodiment, the packet patterns are transferred from the RAM 202 to the RAM 303 according to an instruction from the CPU 201 of the main controller 101 when the MFP 100 shifts from the normal state to the power saving state.

The wireless transmission/reception section 304 is connected to the antenna 305 to perform physical and electrical processing for modulation and demodulation of a carrier wave used in data transmission and reception during wireless connection.

The host interface 306 is a bus conversion section for connection to the system bus 207. The host interface 306 is implemented by a general interface, such as a SDIO (secure digital input/output) and a USB (universal serial bus).

The wireless LAN interface 224 further includes a DMA (direct memory access) section, not shown, and transmits and receives data between the RAM 303 and the RAM 202 of the main controller 101 via the host interface 306.

Next, the access point 112 will be described in detail with reference to FIG. 4.

Figure 4:
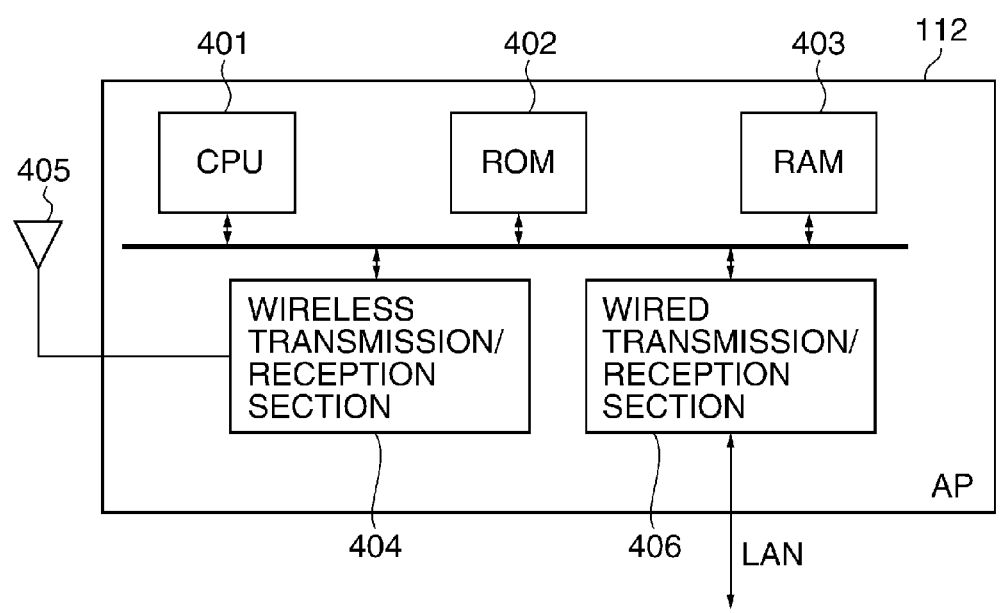
FIG. 4 is a detailed block diagram of a wireless LAN access point (AP).

FIG. 4 is a detailed block diagram of the access point 112.

The access point 112 includes a CPU 401, a ROM 402, a RAM 403, a wireless transmission/reception section 404, an antenna 405, and a wired transmission/reception section 406.

The CPU 401 functions as a main controller of the access point 112. The ROM 402 stores a boot program executed when the access point 112 is started up, and an operation program executed by the CPU 401.

The RAM 403 is used as a work memory for the CPU 401. Further, the RAM 403 stores information on a communication method, an authentication method, various addresses, etc., as various management information used for wirelessly connecting to the MFP 100.

The wireless transmission/reception section 404 is connected to the antenna 405 to perform modulation and demodulation of a carrier wave used in data transmission and reception during wireless connection. The wired transmission/reception section 406 includes a MAC (media access control) controller and a PHY chip, and performs physical and electrical processing necessary for wired connection to the LAN.

Next, a process executed when the MFP 100 is connected to the access point 112 by the wireless LAN will be described with reference to FIG. 5.

In the present embodiment, it is assumed that the access point 112 corresponds to the proxy ARP (address resolution protocol) function defined by the IEEE 802.11v standard, and the proxy ARP function has been enabled. When an ARP request is received, the access point 112 determines, based on the above-mentioned management information, whether or not a device (e.g. the MFP 100) having an IP address as a destination of the received ARP request is connected thereto. Then, if it is determined that the device is connected, the access point 112 responds to the ARP request by proxy on behalf of the device, and notifies the MAC address of the device to the sender of the ARP request.

The MFP 100 is connected to the access point 112 by wireless LAN, and changes packet patterns for determining communication requests to which the MFP 100 can respond in the power saving state, depending on whether or not the access point 112 has the proxy ARP function.

Figure 5:
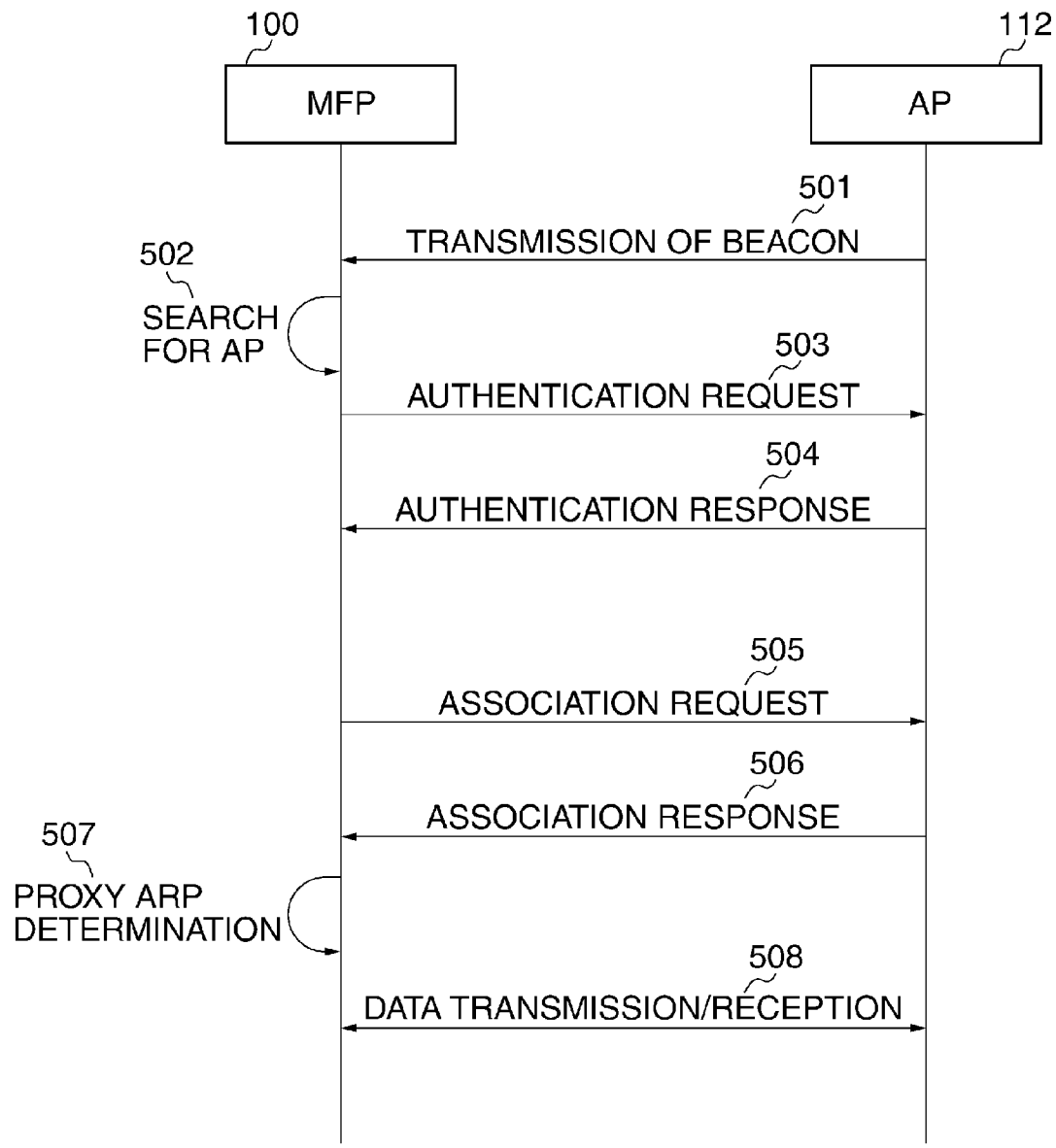
FIG. 5 is a sequence diagram of operations performed during wireless connection between the MFP and the AP.

FIG. 5 is a sequence diagram of operations performed during wireless connection between the MFP 100 and the access point 112. The process illustrated in FIG. 5 is started when the MFP 100 attempts to connect to the access point 112. Further, processing in the MFP 100 is executed by the CPU 201 which controls the wireless LAN interface 224.

Referring to FIG. 5, the access point 112 transmits access point identification information by broadcast transmission using a beacon frame (501).

The MFP 100 receives the beacon frame for a predetermined time period, and searches for an access point based on the access point identification information described in the beacon frame (502). If the search for the access point is successful, the MFP 100 transmits preliminary shared key information associated with an authentication type to the access point found based on the received access point identification information, as an authentication request (503).

If the received preliminary shared key information is valid, the access point 112 sends an authentication response allowing the MFP 100 to connect, whereas if not, the access point 112 sends an authentication response not allowing the MFP 100 to connect (504). Note that if the access point identification information contains no authentication settings, authentication processing is not performed.

Next, the MFP 100 sends an association request so as to connect to the access point (505).

The access point 112 sends an association response allowing the MFP 100 to connect in response to the association request, whereby connection is established (506). Since the access point 112 supports the proxy ARP function, the access point 112 sends proxy ARP support information together with the association response. More specifically, the access point 112 sends the association response in which a bit value of Proxy ARP Service included in extended Capability Field defined by the IEEE 802.11v standard is set to 1.

Upon receipt of the association response, the MFP 100 determines whether or not the wireless LAN access point to which the self-apparatus is connected supports the proxy ARP function based on the proxy ARP support information included in the response information (507). Then, depending on a result of the determination, the MFP 100 changes a packet pattern file for determining whether or not received packets are those to which the MFP 100 can respond in the power-saving mode (507). This proxy ARP determination process will be described in detail hereinafter. Upon completion of the association response, the MFP 100 and the access point 112 are enabled to transmit and receive data (508).

Next, the proxy ARP determination process executed by the MFP 100 (507 in FIG. 5) will be described in detail with reference to FIG. 6.

Figure 6:
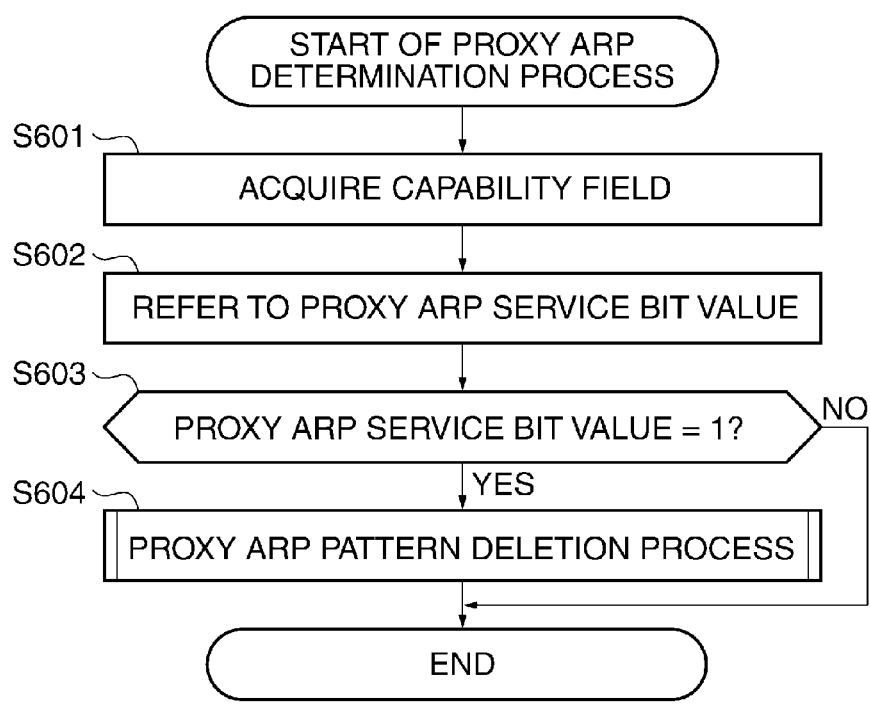
FIG. 6 is a flowchart of a proxy ARP determination process executed by the MFP.

FIG. 6 is a flowchart of the proxy ARP determination process executed by the MFP 100. The present process is executed after the wireless LAN interface 224 transfers data received by the association response to the RAM 202 of the main controller 101, and the CPU 201 of the main controller 101 detects completion of the transfer. Further, the present process is executed by the CPU 201 based on the operation program loaded into the RAM 202.

First, in a step S601, the CPU 201 acquires the extended Capability Field of the received association response, stored in the RAM 202.

Next, in a step S602, the CPU 201 refers to a bit value of Proxy ARP Service of the read extended Capability Field.

Next, in a step S603, the CPU 201 determines whether or not the bit value referred to in the step S602 is equal to 1. If it is determined that the bit value of Proxy ARP Service is equal to 1, the CPU 201 proceeds to a step S604. On the other hand, if it is determined in the step S603 that the bit value of Proxy ARP Service is not equal to 1, the CPU 201 terminates the present process without changing any packet pattern.

In the step S604, the CPU 201 deletes a pattern associated with the proxy ARP (hereinafter also referred to as the "proxy ARP pattern") from a packet pattern file used for determining whether or not the MFP 100 can respond to a communication request in the power saving state, followed by terminating the present process. A proxy ARP pattern deletion process in the step S604 will be described in detail hereinafter.

Next, the proxy ARP pattern deletion process executed in the step S604 in FIG. 6 will be described with reference to FIG. 7.

Figure 7:
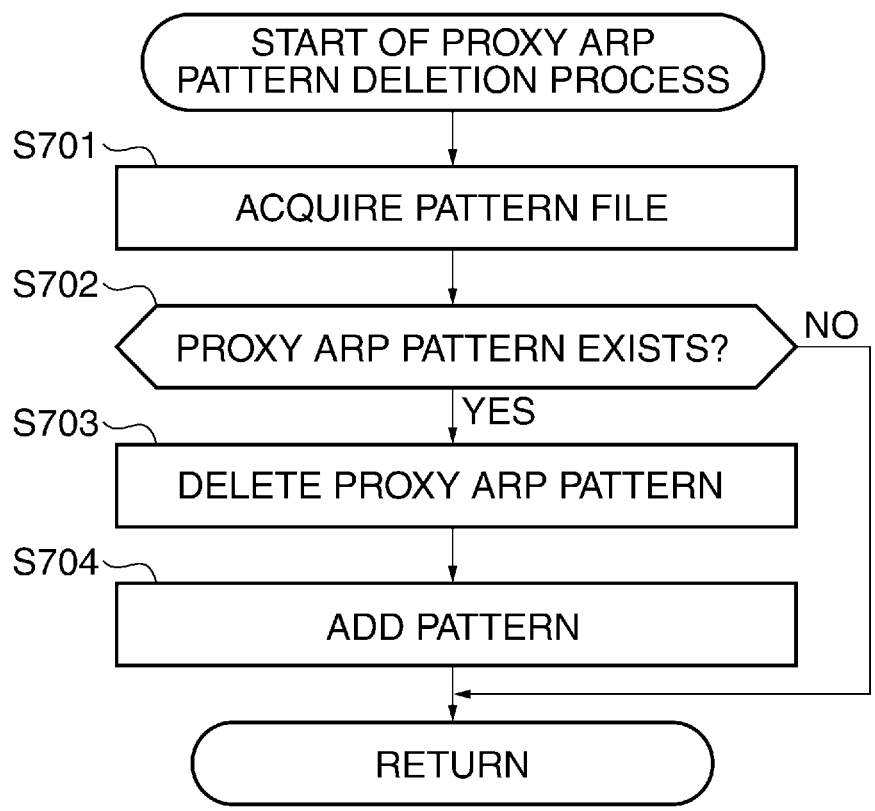
FIG. 7 is a flowchart of a proxy ARP pattern deletion process executed in a step in FIG. 6.

FIG. 7 is a flowchart of the proxy ARP pattern deletion process executed in the step S604 in FIG. 6. The present process is executed by the CPU 201 based on the operation program loaded into the RAM 202.

First, in a step S701, the CPU 201 acquires the current packet pattern file by referring to an address associated with the packet pattern stored in the RAM 202.

Next, in a step S702, the CPU 201 determines whether or not there is a pattern associated with the proxy ARP by referring to the acquired packet pattern file. If it is determined that there is no pattern associated with the proxy ARP, the CPU 201 terminates the present process without deleting any pattern. On the other hand, if it is determined in the step S702 that there is a pattern associated with the proxy ARP, the CPU 201 deletes the pattern associated with the proxy ARP from the packet pattern file (step S703). Then, in a step S704, the CPU 201 adds a packet pattern in place of the deleted pattern associated with the proxy ARP, and returns.

FIG. 8A is a diagram showing an example of a packet pattern file in the initial state, stored in the MFP 100.

Referring to FIG. 8A, the packet pattern file, denoted by reference numeral 800, has a maximum of three packet patterns associated with respective types of communication requests. In the illustrated example, the packet pattern file 800 contains three patterns: an ARP request pattern 801, an SNMP request pattern 802, and a request-to-self-apparatus pattern 803. Further, the packet pattern file 800 in the initial state includes the items of a request type 807 indicating a packet pattern, a setting 804 indicative of an operation to be performed upon receipt of a communication request, set for each packet pattern, and a setting 805 indicative of whether the pattern is valid or invalid. The SNMP request pattern 802 includes MIB (management information base) for printer management, supported by Windows (registered trademark).

Pattern determination is performed according to an ascending order of numbers assigned as IDs 806 to respective packet patterns. The received communication request is compared first with an ARP request pattern having an ID of 1, and if they do not match, the received communication request is compared next with the SNMP request pattern having an ID of 2.

The MFP 100 in the power saving state determines reception of the ARP request or the SNMP request by using the packet pattern file in the initial state, and the CPU 301 of the wireless LAN interface 224 performs response processing without returning the apparatus itself to the normal state. On the other hand, differently from the ARP request and the SNMP request, when a communication request addressed to the self-apparatus is received, the MFP 100 is caused to return from the power saving state to the normal state, and then the CPU 201 of the main controller 101 performs response processing.

FIG. 8B is a diagram showing details of a packet pattern indicated by ARP in the ARP request pattern 801 appearing in FIG. 8A.

Referring to FIG. 8B, the packet pattern of the ARP request pattern 801 includes a destination Ether address which is a MAC address of the destination, a frame type and a protocol type used for identifying a protocol, and an operation indicating contents of a packet. Each item includes a pattern string 810 indicating a comparison character string, and a byte length 811 indicating a length of the pattern string 810. The items included in the pattern are not limited to the illustrated example, but may be changed insofar as it is possible to determine a communication request to which the MFP 100 is to respond, and for example, an item of a transmitter address may be added, or the item of the protocol type may be deleted.

Further, each item is defined by a predetermined data location in a packet (frame) defined by RFC (request for comment). The CPU 301 of the wireless LAN interface 224 can acquire each item by referring to data of the byte length 811 starting from a data location of a predetermined offset amount based on the definition of RFC, based on the start address of the RAM 303 storing the received packet. The pattern strings 810 defined for the respective items and the acquired data are compared with each other, and if the pattern strings 810 match the acquired data in all of the items, the processing set in the setting 804 indicative of an operation to be performed upon receipt of a communication request is performed.

In the present embodiment, by execution of the proxy ARP pattern deletion in the step S703 in FIG. 7, a packet pattern file 820 shown in FIG. 8C is acquired. After that, when the step S704 in FIG. 7 for adding a pattern is executed, a new SNMP request pattern 831, for example, which is a request pattern of SNMP including a unique MIB, is added with an ID of 2 added thereto without changing the ID of the SNMP request pattern 802, as shown in FIG. 8D. Further, the ID of the request-to-self-apparatus pattern 803 is changed from 2 to 3. As a consequence, a changed packet pattern file 830 shown in FIG. 8D is obtained.

It is assumed that the processing for adding a pattern in the step S704 in FIG. 7 is executed, based on a count table 840 (reception frequency table) shown in FIG. 8E, for a communication request received by the MFP 100 in the normal state. The count table 840 is table information indicative of the number of times of reception of a communication request of each type.

More specifically, the SNMP request pattern 802 is set to an ID of 1 indicating highest priority because the SNMP request pattern 802 has the largest number of times of reception when the count table 840 is referred to. Further, the SNMP request pattern 831 (unique MIB2), which has the second largest number of reception on the count table 840, is added with an ID of 2.

By using the packet pattern file 830 having the pattern added thereto as shown in FIG. 8D, the MFP 100 can determine an SNMP request and an SNMP request associated with the unique MIB, received in the power saving state, and respond to them. Further, when a communication request addressed to the self-apparatus (request-to-self-apparatus pattern) is received, the MFP 100 is caused to return from the power saving state to the normal state, and can continue processing.

Note that the proxy ARP pattern deletion process is not limited to the above. For example, after the proxy ARP pattern is deleted in the step S703, it is not necessarily required to add a pattern by the pattern addition processing in the step S704. In this case, the packet pattern file 820 shown in FIG. 8C is obtained by the proxy ARP pattern deletion process shown in FIG. 7. At this time, the MFP 100 can respond to an SNMP request received in the power saving state, and can return to the normal state when receiving a communication request to the self-apparatus to continue processing.

Next, with reference to FIG. 9, a description will be given of a process performed by MFP 100 in the power saving state for responding to an SNMP request received after responding to an ARP request received from the PC 110.

FIG. 9 is a sequence diagram of a data communication process executed between the PC 110, the MFP 100, and the access point 112. Note that the illustrated process is started assuming that the MFP 100 is in the normal state, the PC 110 is in a state incapable of solving the MAC address of the MFP 100, and the MFP 100 is connected to the access point 112. Further, it is assumed that the MFP 100 has already been registered as a device in the PC 110.

The MFP 100 shifts from the normal state to the power saving state (900). The MFP 100 shifts to the power saving state e.g. in a case where the CPU 201 detects, using a timer (not shown) included in the main controller 101, that no communication request has been received or no operation on the console section 102 has been performed for a predetermined time period. Further, the MFP 100 shifts to the power saving state in a case where the CPU 201 detects pressing of a power saving state shift button, not shown, provided on the console section 102.

When the MFP 100 shifts from the normal state to the power saving state, the packet pattern file is transferred to the RAM 303 of the wireless LAN interface 224 according to an instruction from the CPU 201, and the CPU 301 is enabled to refer to the packet pattern file.

After the MFP 100 has shifted to the power saving state, the PC 110 having e.g. Windows (registered trademark) installed therein transmits a management SNMP request to the MFP 100 registered therein as a device for use, at predetermined time intervals, to confirm the existence of the MFP 100 (901).

Next, the PC 110 recognizes that the ARP table of a protocol stack, not shown, provided therein has no MAC address of the MFP 100, and transmits an ARP request for solving the MAC address of the MFP 100 by broadcast transmission (902).

Upon receipt of the ARP request for solving the MAC address of the MFP 100, the access point 112 determines, based on the management information of connected devices, stored in the RAM 403, whether or not a device having an IP address of a destination of the ARP request exists (903). In the case of the present example, the IP address of the destination of the ARP request coincides with the IP address of the MFP 100. Therefore, the access point 112 responds to the ARP request by the proxy ARP function on behalf of the MFP 100, and notifies the MAC address of the MFP 100 to the PC 110 (904).

The PC 110 solves the MAC address of the MFP 100 by receiving the ARP response (905), and transmits an SNMP request to the MFP 100 (906). The SNMP request is transmitted to the MFP 100 via the access point 112 (907).

The MFP 100 determines that the SNMP request received via the wireless LAN interface 224 as a communication request to the self-apparatus based on the packet pattern file 830, and responds to the SNMP request while maintaining the power saving state (908).

The response to the SNMP request is sent to the access point 112 (909), and then is received by the PC 110 (910), whereby confirmation of existence of the MFP 100 becomes successful.

The above-described SNMP request is not limited to that of SNMP used by Windows (registered trademark), and for example, the SNMP request may be a request of SNMP including a unique MIB, which is used by other device management-related applications. In this case as well, the MFP 100 can determine a communication request to which the MFP 100 can respond, using the SNMP request pattern 831 associated with the unique MIB, which has been added in the process shown in FIG. 7, and can respond to the communication request while maintaining the power saving state.

Further, the packet pattern file 830 may be confirmed on the console section 102 when the MFP 100 is in the normal operation state.

Figure 10A:
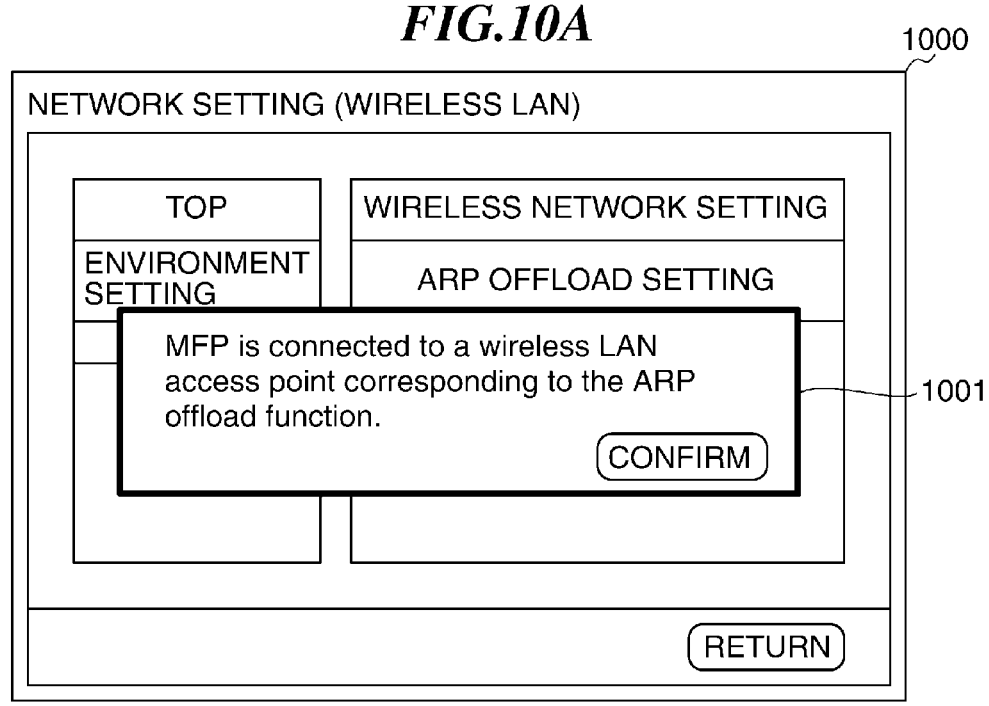
FIG. 10A is a diagram showing a network setting screen displayed on a liquid crystal touch panel of a console section, in a case where a window showing a state of connection of the MFP to the AP is displayed.
Figure 10B:
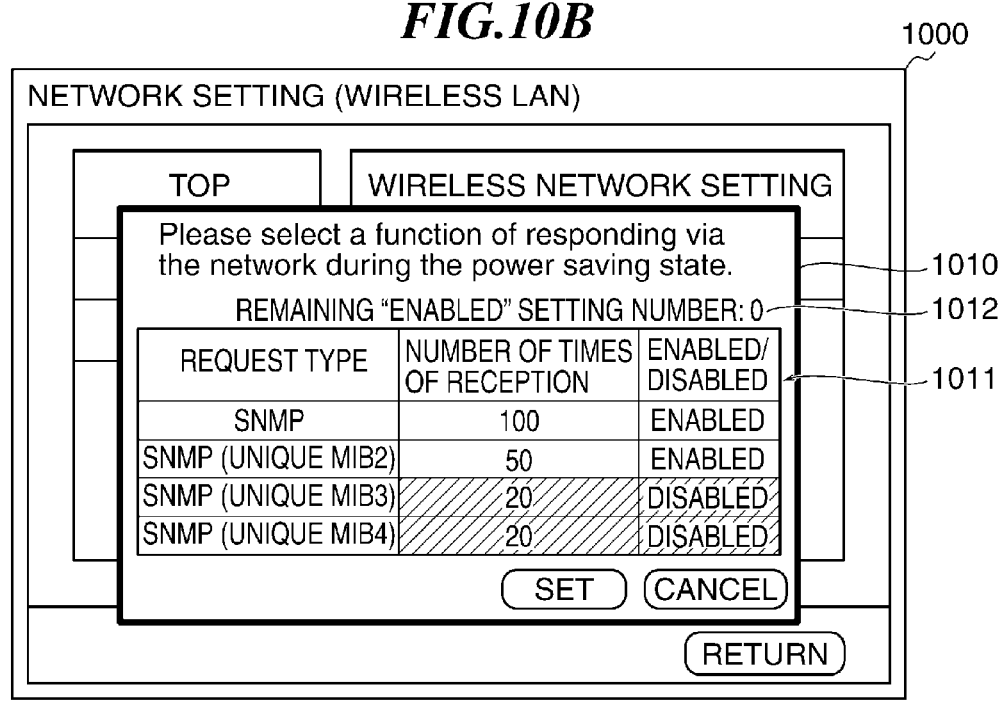
FIG. 10B is a diagram showing a network setting screen displayed on a liquid crystal touch panel of a console section, in a case where a window for selecting a communication request to which the MFP is to respond in the power saving state.

FIGS. 10A and 10B are diagrams each showing an example of a network setting screen displayed on the liquid crystal touch panel of the console section 102. The screens shown in FIGS. 10A and 10B are displayed by performing a predetermined menu operation by the user on the console section 102 when the MFP 100 is in the normal state.

The setting screen shown in FIG. 10A, denoted by reference numeral 1000, displays a window 1001 indicative of whether or not the MFP 100 is connected to the access point 112 supporting the proxy ARP based on a result of the proxy ARP determination process in FIG. 6. The illustrated example displays a message to the effect that the MFP 100 is connected to a wireless LAN access point supporting the proxy ARP. On the other hand, if the answer to the question of the step S603 in FIG. 6 is negative (NO), the setting screen 1000 displays a message to the effect that the MFP 100 is connected to a wireless LAN access point which does not support the proxy ARP.

The setting screen 1000 shown in FIG. 10B displays a window 1010 used for selecting a type of a communication request to which the MFP 100 responds in the power saving state, based on the packet pattern file 830 determined in the proxy ARP pattern deletion process shown in FIG. 7.

The selection window 1010 displays, as information based on the count table 840, the number of times of reception of each SNMP request and whether a response is enabled/disabled in the power saving state (1011). Further, a remaining "enabled" setting number 1012 displays an upper limit of the number of "enabled" settings. The setting of "enabled/disabled" may be changed by operation on a predetermined menu, not shown, displayed on the console section 102. In the present embodiment, the remaining "enabled" setting number 1012 is 0, and by disabling an SNMP request which has been set to be enabled, it is possible to change another SNMP request into an enabled setting.

As described above, the MFP 100 determines whether or not the access point 112 can respond to a received communication request on behalf of the self-apparatus, and changes a packet pattern used for determining a type of the communication request in the power saving state based on the determination result. Then, by using the changed packet pattern in the power saving state, it is possible to perform response processing on a larger number of communication requests by a change of packet patterns. As a consequence, it is possible to maintain the power saving state for a longer time period, and thereby realize further power saving of the information processing apparatus.

Note that the above-described embodiment does not limit the present invention. For example, by execution of the proxy ARP pattern deletion process in FIG. 7, the packet pattern file 820 from which a pattern associated with the proxy ARP is deleted may be obtained. Also in this case, the MFP 100 can respond to an SNMP request in the power saving state without performing the response processing for an ARP request while maintaining the power saving state by using the proxy ARP function of the access point 112. That is, by using the small-sized packet pattern file 820 from which a useless pattern has been deleted, it is possible to reduce load of transfer processing of the packet pattern and the memory capacity required for storage of the same without lowering the conventional function of response processing to communication requests in the power saving state.

Further, in the above-described embodiment, deletion of a packet pattern to which the MFP 100 responds in the power saving state is not limited to a pattern associated with the ARP request. That is, any other pattern may be deleted insofar as it is a pattern to which the access point 112 connected to the MFP 100 can respond and also which is associated with a communication request to which the MFP 100 can respond in the power saving state.

Furthermore, in the above-described embodiment, in a case where proxy ARP of the access point 112 to which the MFP 100 is connected becomes unavailable after the pattern associated with the proxy ARP is deleted, the pattern associated with the proxy ARP may be set again. As a consequence, for example, when the MFP 100 is reconnected to another wireless LAN access point which does not support the proxy ARP function, by using the packet pattern file 800 in the initial state, the MFP 100 can send an ARP response to a communication request in the power saving state.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-073048, filed Mar. 29, 2013, which is hereby incorporated by reference herein in its entirety.

What is claimed is:

1. An information processing apparatus that communicates with an external apparatus via a relay apparatus, comprising:
   a response unit configured to respond, when the information processing apparatus operates in a power-saving mode, to a reception packet received by the information processing apparatus while maintaining the power-saving mode according to a response condition;
   a determination unit configured to determine whether or not the relay apparatus has a response function of responding to a reception packet, on behalf of the information processing apparatus, received by the relay apparatus; and
   a changing unit configured to change the response condition when the determination unit determines that the relay apparatus has the response function,
   wherein the response condition indicates a plurality of packet patterns,
   the response unit is configured to respond to the reception packet received by the information processing apparatus while maintaining the power-saving mode, when the reception packet received by the information processing apparatus matches any one of the plurality of reception patterns, and
   the changing unit is configured to delete the packet pattern corresponding to the response function of the relay apparatus, out of the plurality of packet patterns.

2. The information processing apparatus according to claim 1, wherein
   the changing unit is configured to delete the packet pattern corresponding to the response function of the relay apparatus, out of the plurality of packet patterns, and add a new packet pattern.

3. The information processing apparatus according to claim 2, wherein the response function includes a function of the relay apparatus responding to an ARP request, on behalf of the information processing apparatus, and
   the changing unit is configured to delete the packet pattern corresponding to the ARP request, out of the plurality of packet patterns.

4. The information processing apparatus according to claim 1, wherein the response function includes a function of the relay apparatus responding to an ARP request, on behalf of the information processing apparatus, and
   the changing unit is configured to delete the packet pattern corresponding to the ARP request, out of the plurality of packet patterns.

5. The information processing apparatus according to claim 1, wherein the relay apparatus is an access point.

6. The information processing apparatus according to claim 1, wherein the information processing apparatus includes a printing apparatus.

7. A method of controlling an information processing apparatus that communicates with an external apparatus via a relay apparatus, comprising:
   responding, when the information processing apparatus operates in a power-saving mode, to a reception packet received by the information processing apparatus while maintaining the power-saving mode according to a response condition;
   determining whether or not the relay apparatus has a response function of responding to a reception packet, on behalf of the information processing apparatus, received by the relay apparatus; and
   changing the response condition when it is determined that the relay apparatus has the response function,
   wherein the response condition indicates a plurality of packet patterns,
   the reception packet received by the information processing apparatus is responded to while maintaining the power-saving mode, when the reception packet received by the information processing apparatus matches any one of the plurality of reception patterns, and
   the packet pattern corresponding to the response function of the relay apparatus is deleted, out of the plurality of packet patterns.

8. A non-transitory computer-readable storage medium storing a computer-executable program for causing a computer to execute a method of controlling an information processing apparatus that communicates with an external apparatus via a relay apparatus,
   wherein the method comprises:
   responding, when the information processing apparatus operates in a power-saving mode, to a reception packet received by the information processing apparatus while maintaining the power-saving mode according to a response condition;
   determining whether or not the relay apparatus has a response function of responding to a reception packet, on behalf of the information processing apparatus, received by the relay apparatus; and
   changing the response condition when it is determined that the relay apparatus has the response function,
   wherein the response condition indicates a plurality of packet patterns,
   the reception packet received by the information processing apparatus is responded to while maintaining the power-saving mode, when the reception packet received by the information processing apparatus matches any one of the plurality of reception patterns, and
   the packet pattern corresponding to the response function of the relay apparatus is deleted, out of the plurality of packet patterns.

9. An information processing apparatus that communicates with an external apparatus via a relay apparatus, comprising:
   a storage device; and
   a processor configured to execute computer executable instructions recorded on the storage device, the computer executable instructions including instructions, that when executed by the processor, cause the information processing apparatus to:
   respond, when the information processing apparatus operates in a power-saving mode, to a reception packet received by the information processing apparatus while maintaining the power-saving mode according to a response condition;
   determine whether or not the relay apparatus has a response function of responding to a reception packet, on behalf of the information processing apparatus, received by the relay apparatus; and change the response condition when it is determined that the relay apparatus has the response function,
wherein the response condition indicates a plurality of packet patterns, and
wherein the information processing apparatus is caused to respond to the reception packet received by the information processing apparatus while maintaining the power-saving mode, when the reception packet received by the information processing apparatus matches any one of the plurality of reception patterns, and to delete the packet pattern corresponding to the response function of the relay apparatus, out of the plurality of packet patterns.

10. The information processing apparatus according to claim 9,
wherein the information processing apparatus is caused to delete the packet pattern corresponding to the response function of the relay apparatus, out of the plurality of packet patterns, and add a new packet pattern.

11. The information processing apparatus according to claim 10, wherein the response function includes a function of the relay apparatus responding to an ARP request, on behalf of the information processing apparatus, and
wherein the information processing apparatus is caused to delete the packet pattern corresponding to the ARP request, out of the plurality of packet patterns.

12. The information processing apparatus according to claim 9, wherein the response function includes a function of the relay apparatus responding to an ARP request, on behalf of the information processing apparatus, and
wherein the information processing apparatus is caused to delete the packet pattern corresponding to the ARP request, out of the plurality of packet patterns.

13. The information processing apparatus according to claim 9, wherein the relay apparatus is an access point.

14. The information processing apparatus according to claim 9, wherein the information processing apparatus includes a printing apparatus.

* * * * *